April 9, 1963　　V. J. HULTQUIST　　3,084,825
STORAGE CONTAINER FOR VEHICLES
Filed Jan. 19, 1961　　2 Sheets-Sheet 1

INVENTOR.
VICTOR J. HULTQUIST
BY
ATTORNEY

April 9, 1963 V. J. HULTQUIST 3,084,825
STORAGE CONTAINER FOR VEHICLES
Filed Jan. 19, 1961 2 Sheets-Sheet 2

INVENTOR.
VICTOR J. HULTQUIST
BY
ATTORNEY ed States Patent Office 3,084,825
Patented Apr. 9, 1963

3,084,825
STORAGE CONTAINER FOR VEHICLES
Victor J. Hultquist, P.O. Box 66, Alcoa, Tenn.
Filed Jan. 19, 1961, Ser. No. 83,763
15 Claims. (Cl. 220—8)

This invention relates generally to containers and more particularly to an improved storage box, for use on vehicles, boats, and the like, which can be expanded or contracted at will depending upon the amount of storage space required.

In storage containers of the subject type, it is important that provision be made for varying the cubic content, or volume, of the box at will so as to enable carrying different and greater amounts of luggage. Yet, when the articles, or luggage, to be carried are of lesser volume, the storage box should occupy a minimum of space and offer a minimum of wind resistance to the movement of the vehicle to which it is attached. Aside from these important considerations, it is desirable that the box be closed by a cover which can be locked to prevent pilfering when not under observation by the owner, as when the vehicle is parked. It is further desirable that the means for expanding and contracting the storage box be easy to use and quick to operate.

Accordingly, it is a primary object of this invention to provide a variable volume container for vehicles which may be readily fastened to a vehicle, such as to the roof of an automobile, having a hinged cover which may be locked, and having side walls which are expandable and contractable at will to enable the user to contain his luggage in a minimum of volumetric space.

Another object of the invention is to provide an expandable storage box of the above indicated characteristics wherein the side walls of the container are telescoping in nature or are otherwise expandable and contractable, as by use of a bellows construction which folds and unfolds.

Yet another object of the invention is to provide a variable volume storage container of the above indicated characteristics which may be quickly adjusted to minimum volume so as to offer minimum resistance to movement of the vehicle to which it is attached.

A further object of the invention is to provide an expandable storage box of the above indicated characteristics wherein screw operated lever means are provided for expanding or contracting the side walls of the box.

Still another object of the invention is to provide an expandable storage box of the above indicated characteristics which is easy to expand and to contract, which is of simple construction and inexpensive to fabricate.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings wherein like reference characters indicate like parts throughout the several figures and in which:

Figure 1:
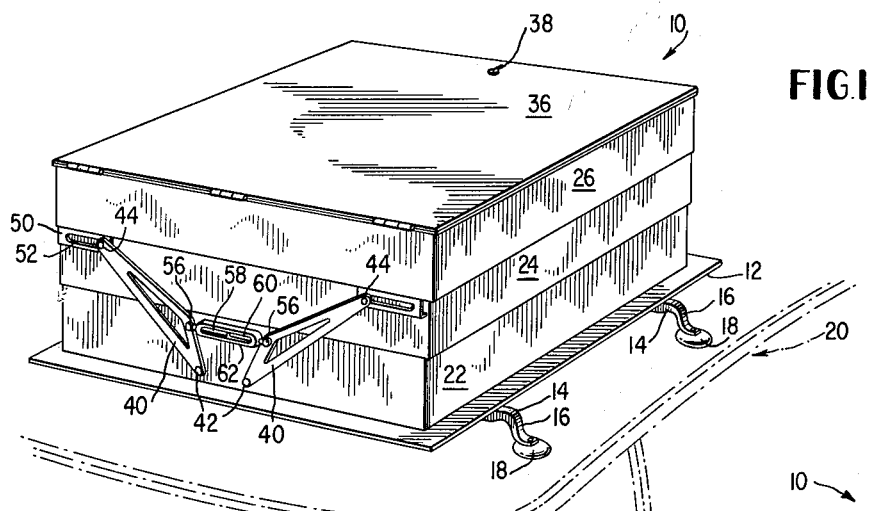
FIG. 1 is a perspective view of a storage container constructed in accordance with the invention.

Referring now to the drawings and more particularly to FIGS. 1–7, there is shown a preferred embodiment of the container in the form of a rectangular box 10 having a bottom 12, to the under side of which are fastened a plurality of mounting bars 14 having downturned legs 16 and suction cup feet 18. These permit the box to be suitably secured on top of an automobile roof partially shown at 20.

The walls of the box are formed as telescoping sections 22, 24 and 26 which nest within each other when contracted. Each of the sections is formed of vertically extending walls of any desired length and connected at their ends to form a rectangular or other shaped frame. At the bottom of each section, or frame, is an inturned flange 28, FIG. 5, and a similar but outwardly projecting flange 30 is formed at the top of each frame section. Between the sections and supported on the inturned flange 28 may be placed a gasket 32 to seal the box when it is in its expanded condition and to lessen the friction, or abrasion, and noise of the sections 22, 24, 26, as they slide with respect to each other during expansion or contraction of the box. Fastened in any suitable manner to the flange 30 of the uppermost section 26 is a horizontally extending thin frame 34. A cover 36 is hinged at one end to frame 34 and is provided with conventional key operated means interfitting with the lock 38, FIG. 6, carried by frame 34 when the cover is in its closed position flush with the frame. The walls, top and bottom of the box, can be formed of wood, composition board, metal such as aluminum, plastic or any suitable combination of these materials.

Figure 3:
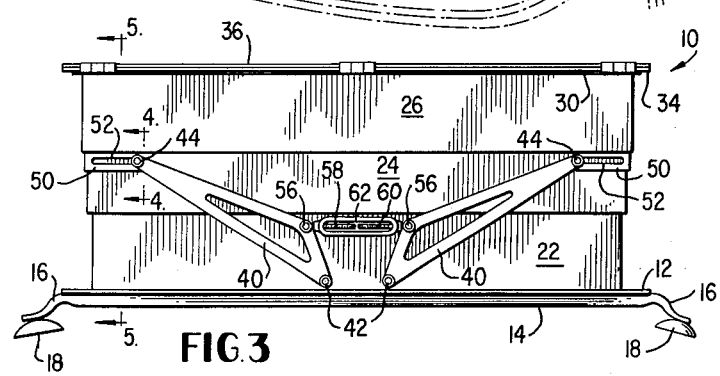
FIG. 3 is an elevational view similar to FIG. 2 but showing the box expanded to its maximum size.
Figure 5:
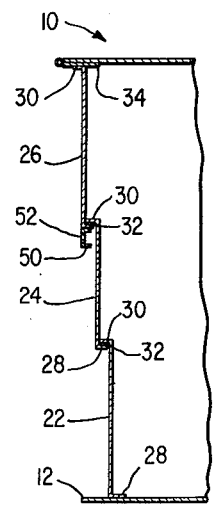
FIG. 5 is a fragmentary sectional view taken on line 5—5 of FIG. 3.
Figure 2:
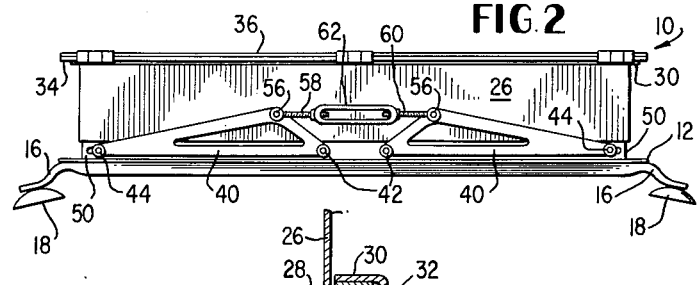
FIG. 2 is a slightly enlarged elevation of the box shown in FIG. 1 illustrating the container in its smallest volumetric condition.
Figure 4:
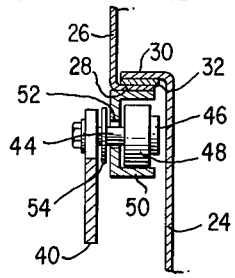
FIG. 4 is a fragmentary sectional view taken on line 4—4 of FIG. 3.
Figure 6:
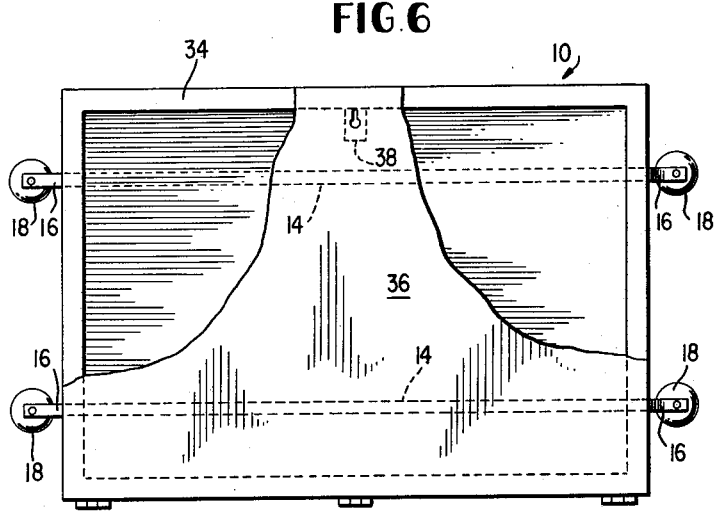
FIG. 6 is a top plan view of the storage container illustrated in FIG. 1 with part of the cover broken away.

To telescope the box into its expanded or contracted condition, there is provided at one side a screw lever, quick acting mechanism as best shown in FIGS. 2 and 3. This mechanism comprises a pair of identical angular levers 40, each pivoted at its lower end by pins 42 to the lower portion of the box section 22. At their upper ends, the levers 40 are provided with horizontally extending shafts 44, threadedly secured to the levers and having heads 46 at their inner ends for retaining the small rollers 48. The rollers are adapted to move between the flanges of C-shaped guide channels 50 which are secured to the under side of the inturned flange 28 on the uppermost box wall section 26. The guide channels 50 are slotted lengthwise at 52 to allow passage of the shafts 44. Suitable spacer washers 54 surround the shafts 44 between the levers 40 and the guide channels 50.

The levers 40 are illustrated as being triangular in shape with central cutouts to reduce their weight and increase their rigidity. However, whether of this shape or of angular form, the bent portion of each lever, or the third apex of the triangle is provided with a pivot pin 56 for securement of one of the pair of screw shafts 58 and 60 which are oppositely threaded. The screw shafts are manipulated by a turnbuckle 62 suitably threaded to receive the unconnected ends of the screw shafts.

It will be readily apparent that when the turnbuckle is turned in one direction to force the screw shafts 58, 60 outwardly therefrom, the levers 40 will also turn outwardly on pivots 42 causing the rollers 48, at their upper ends, to slide or roll in the guide channels 50 contracting the box wall so that sections 22, 24, and 26 nest within each other and occupy a minimum of volume as shown in FIG. 2. When, however, the turnbuckle 62 is turned in the opposite direction, the screw shafts are drawn toward each other, rapidly turning the levers 40 toward each other and forcing the box wall to expand extending sections 22, 24, and 26 to their maximum height as shown in FIG. 3.

Figure 7:
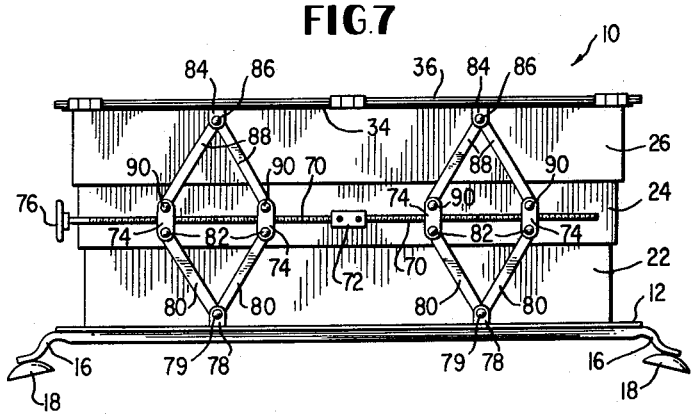
FIG. 7 is an elevational view similar to FIG. 3 taken from the opposite side.

For reasons to be explained later, it is preferred to provide the opposite side of the container 10 with a different screw jack mechanism, herein termed diamond link screw jacks. Referring principally to FIG. 7, this mechanism comprises a pair of screw shafts 70 which are axially aligned and pinned together by a central coupling 72. Each shaft 70 is threaded oppositely from its ends to its center and these two portions threadedly engage separately a pair of sleeves 74. The shafts 70 are manipulated as one by a hand wheel 76 which may be mounted on either shaft or, if desired, on both. A pair of angles or stirrups 78 are secured to the bottom wall 12 of the box. To each of these is pivotally secured at 79 a pair of links 80 whose upper ends are pivotally connected at 82 to the sleeves or collars 74. Similarly, the upper frame 34 of the box has affixed to it, the downwardly extending stirrups 84 to which are pivoted a pair of links 88 at 86. The lower ends of links 88 are pivoted at 90 to the collars 74.

Figure 8:
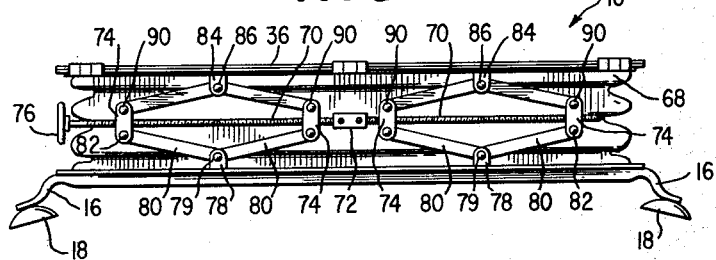
FIG. 8 is an elevational view similar to FIG. 2 but showing a modified container in its most contracted condition.

It will be readily apparent that turning the hand wheel 76 in one direction, will move the collars 74 of each set toward each other, while turning the hand wheel in the opposite direction will separate the collars by reason of the different threading of each section of the screw shafts 70. These movements of the collars impart, through the links 80 and 88, upward and downward movements respectively, to the box frame 34. Thus, the box is expanded or contracted to increase or decrease its volumetric capacity. FIG. 8 illustrates the diamond links when the box (here of different form) is contracted.

The angular levers at one side of the box, FIGS. 2 and 3, have a resultant quick action, however, these levers tend to impart a slight rocking movement to the side walls of the box as they are operated. Consequently, it is preferred to counteract this movement by utilizing the diamond link jacks of FIGS. 7 and 8 at the other end of the box because their operation moves the walls rectilinearly. The diamond jacks, although they move more slowly, restrain the box side walls from rocking. It will, therefore, be apparent that it is within the principles of this invention, to use angular levers at both sides of the box, or diamond jack links at both sides, although it is preferred to use one set of angular levers at one side and a set of diamond link jacks at the opposite side.

Figure 9:
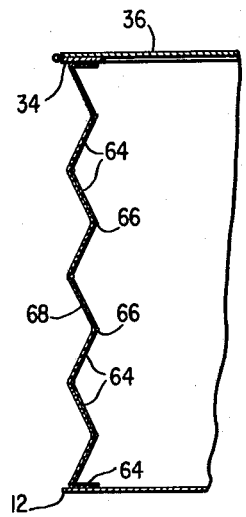
FIG. 9 is a fragmentary, vertical, sectional view of the container of FIG. 8 in its expanded condition.
Figure 10:
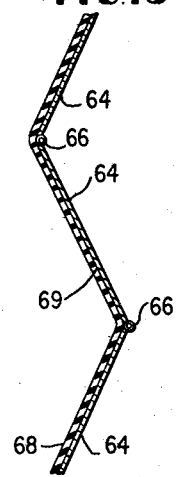
FIG. 10 is an enlarged view of a fragment of the side walls of the box shown in FIG. 9.

In FIGS. 8-10, there is shown a modified form of the invention in which accordian type side walls are provided for the box in place of telescoping frame sections. In this embodiment, the side walls of the box comprise a series of horizontally disposed strips or plates 64 disposed above one another and hinged to each other by piano type, elongated hinges 66. The lowermost plate 64 is suitably fastened to the bottom wall 12 and the uppermost plate to the upper frame 34. These plates or strips are reenforcing members and may be formed of a light metal, such as aluminum, or other suitable, rigid material. Outside the plates are placed flexible, continuous wall skins 68 of leather, rubber or plastic which are preferably cemented at 69 to the surfaces of the plates 64. This construction permits the side walls of the box to be expanded and contracted like a bellows, using the diamond link jacks of FIG. 8 or the lever jacks such as illustrated in FIG. 3.

It will be apparent that the folding side walls of the container of FIGS. 8-10 may utilize vertically extending reenforcing strips, or strips extending in other directions, instead of the horizontal strips 64 described. The extent of wall coverage of these strips is a matter of choice so long as the outer skin 68 is suitably reenforced. Also, the use of telescoping wall sections or folding wall sections is a matter of choice.

It should be further apparent that a box constructed in the form of either of the embodiments illustrated, or variations thereof, will provide a storage space which may be quickly and easily expanded or contracted and will thereby provide a minimum of resistance to wind pressure when installed on a moving vehicle. The described constructions have strength and yet are of light weight, are easily and inexpensively fabricatable, and are easy to install and operate.

Although certain specific embodiments of the invention have been shown and described, it is obvious that many modifications thereof are possible. The invention, therefore, is not to be restricted except insofar as is necessitated by the prior art and by the spirit of the appended claims.

What is claimed is:

1. A storage container comprising a bottom and a top wall, expandable side walls, and screw operated means for expanding and contracting said side walls, said means including a horizontally disposed floating screw shaft having oppositely threaded portions, a pair of collars engaging the oppositely threaded portions, a pair of links pivotally secured at their upper ends to an upper portion of one of said side walls and pivotally secured at their lower ends to said pair of collars and a pair of links pivotally secured at their lower ends to said bottom wall and pivotally secured at their upper ends to said collars.

2. A storage container for vehicles according to claim 1, wherein said top wall is hinged and said container further carries key operated lock means for fastening the top wall in closed position to said side walls.

3. A storage container according to claim 1, wherein said side walls comprise a series of reenforcing strips hingedly connected by piano hinges, and a flexible bellows skin secured to the outside surfaces of said reenforcing strips.

4. A storage container according to claim 3, wherein said flexible skin is cemented to said reenforcing strips.

5. A storage container for mounting on the roof of a vehicle and constructed as described in claim 1 wherein support arms are attached to the container and means is provided for securing said arms to the vehicle roof.

6. A storage container for mounting on the roof of a vehicle according to claim 5 wherein said arm securing means comprises suction cups.

7. A storage container comprising a bottom and a top wall, expandable side walls, and screw operated means for expanding and contracting said side walls, said means including a pair of levers having bend portions each pivoted at one end to a portion of one of said side walls and pivotally and rollably secured at their other ends to a horizontally disposed guide channel secured to another portion of said side wall, a pair of oppositely threaded screws pivotally secured to the bend portions of said levers, and a turnbuckle threadedly engaging the unpivoted ends of said screws.

8. A storage container comprising a bottom and a top wall, expandable side walls, and screw operated means for expanding and contracting said side walls, said means including a floating screw shaft having two sections each section having oppositely threaded portions, a pair of collars for each section engaging the oppositely threaded portions of said screw shaft, a pair of links for each section pivotally secured at their upper ends to an upper portion of one of said side walls and pivotally secured at their lower ends to said pair of collars, and a pair of links for each section pivotally secured at their lower ends to said bottom wall and pivotally secured at their upper end to said collars.

9. A storage container according to claim 8, wherein said screw shaft is provided with a hand wheel for turning the shaft.

10. A storage container comprising a bottom and a top wall, expandable side walls including telescopic sections and screw operated means for expanding and contracting said side walls, said means including at least one angular lever pivoted at one end to a section of the side walls and pivotally and rollably secured at its other end to a horizontally disposed guide channel secured to another section of the side walls, a screw pivotally secured at one end to the angle of said lever and means threadedly engaging said screw to turn the lever.

11. A storage container according to claim 10, wherein said telescoping sections each comprise an upper outturned flange and a lower inturned flange, and a gasket is provided between each section supported by said inturned flanges.

12. A storage container comprising a bottom and a top wall, expandable side walls including telescopic sections and screw operated means for expanding and contracting said side walls, said means including at least one horizontally disposed floating screw shaft having oppositely threaded portions, a pair of collars engaging the oppositely threaded portions of said screw shaft, a pair of links pivotally secured at their upper ends to an upper section of the side walls and pivotally secured at their lower ends to said pair of collars, and a pair of links pivotally secured at their lower ends to a lower section of the side walls and pivotally secured at their upper ends to said collars.

13. A storage container comprising a bottom and a top wall, expandable side walls, and screw operated means connected to different side walls for expanding and contracting said side walls, said means including at least one angular lever pivoted at one end to a section of one side wall and pivotally and rollably secured at its other end to a horizontally disposed guide channel secured to another section of the same side wall, a screw pivotally secured at one end to the angle of said lever and means threadedly engaging said screw to turn the lever, said means further including at another side wall a horizontally disposed floating screw shaft having oppositely threaded portions, a pair of collars engaging the oppositely threaded portions of said screw shaft, a pair of links pivotally secured at their upper ends to an upper section of said other side wall and pivotally secured at their lower ends to said pair of collars, and a pair of links pivotally secured at their lower ends to a lower section of said other side wall and pivotally secured at their upper ends to said collars.

14. A storage container comprising a bottom and a top wall, expandable side walls and screw operated means for expanding and contracting said side walls, said means including at least one angular lever pivoted at one end to a section of the side walls and pivotally and rollably secured at its other end to a horizontally disposed guide channel secured to another section of the side walls, a screw pivotally secured at one end to the angle of said lever and means threadedly engaging said screw to turn the lever.

15. A storage container for mounting on the roof of a vehicle and constructed as described in claim 14 wherein support arms are attached to the container and means is provided for securing said arms to the vehicle roof.

References Cited in the file of this patent
UNITED STATES PATENTS

| | | |
|---|---|---|
| 29,751 | Allen | Aug. 28, 1860 |
| 722,166 | Taft | Mar. 3, 1903 |
| 844,955 | Morgan | Feb. 19, 1907 |
| 932,806 | Paulson | Aug. 31, 1909 |
| 968,633 | Andrews | Aug. 30, 1910 |
| 2,904,209 | Murdock | Sept. 15, 1959 |

FOREIGN PATENTS

| | | |
|---|---|---|
| 38,623 | France | Mar. 24, 1931 |